United States Patent
Hicks et al.

(10) Patent No.: US 10,534,715 B2
(45) Date of Patent: Jan. 14, 2020

(54) OPERATION OF A MULTI-SLICE PROCESSOR IMPLEMENTING A UNIFIED PAGE WALK CACHE

(71) Applicant: International Business Machines Corporation, Armonk, NY (US)

(72) Inventors: Dwain A. Hicks, Pflugerville, TX (US); Jonathan H. Raymond, Richmond, VT (US); George W. Rohrbaugh, III, Charlotte, VT (US); Shih-Hsiung S. Tung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/135,685

(22) Filed: Apr. 22, 2016

(65) Prior Publication Data
US 2017/0308474 A1 Oct. 26, 2017

(51) Int. Cl.
G06F 12/00 (2006.01)
G06F 12/0875 (2016.01)
G06F 12/1045 (2016.01)
G06F 12/0871 (2016.01)

(52) U.S. Cl.
CPC ...... *G06F 12/0875* (2013.01); *G06F 12/0871* (2013.01); *G06F 12/1045* (2013.01); *G06F 2212/684* (2013.01)

(58) Field of Classification Search
CPC combination set(s) only.
See application file for complete search history.

(56) References Cited

U.S. PATENT DOCUMENTS

| | | | |
|---|---|---|---|
| 2008/0133875 A1* | 6/2008 | Cohen | G06F 12/1027 711/207 |
| 2010/0205344 A1 | 8/2010 | Caprioli et al. | |
| 2012/0173842 A1* | 7/2012 | Frey | G06F 9/45558 711/207 |
| 2012/0215979 A1* | 8/2012 | Hunt | G06F 12/0802 711/118 |
| 2013/0198459 A1* | 8/2013 | Joshi | G06F 12/084 711/130 |
| 2014/0372706 A1* | 12/2014 | Nawab Ali | G06F 12/0891 711/135 |
| 2015/0089116 A1 | 3/2015 | Chin et al. | |
| 2015/0127911 A1* | 5/2015 | Steiss | G06F 12/0871 711/123 |
| 2017/0123986 A1* | 5/2017 | Kapoor | G06F 12/0862 |
| 2017/0220466 A1* | 8/2017 | Gupta | G06F 12/084 |

OTHER PUBLICATIONS

Barr et al., "Translation Caching: Skip, Don't Walk (the Page Table)", Proceedings of the 37th Annual International Symposium on Computer Architecture (ISCA'10), Jun. 2010, pp. 48-59, ACM New York, NY, ISBN: 978-1-4503-0053-7.

* cited by examiner

Primary Examiner — Baboucarr Faal
(74) Attorney, Agent, or Firm — Nathan M. Rau

(57) ABSTRACT

Operation of a multi-slice processor that includes a plurality of execution slices, a plurality of load/store slices, and one or more page walk caches, where operation includes: receiving, at a load/store slice, an instruction to be issued; determining, at the load/store slice, a process type indicating a source of the instruction to be a host process or a guest process; and determining, in accordance with an allocation policy and in dependence upon the process type, an allocation of an entry of the page walk cache, wherein the page walk cache comprises one or more entries for both host processes and guest processes.

15 Claims, 6 Drawing Sheets

OPERATION OF A MULTI-SLICE PROCESSOR IMPLEMENTING A UNIFIED PAGE WALK CACHE

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include a page walk cache. Operation of such a multi-slice processor includes: receiving, at a load/store slice, an instruction to be issued; determining, at the load/store slice, a process type indicating a source of the instruction to be a host process or a guest process; and determining, in accordance with an allocation policy and in dependence upon the process type, an allocation of an entry of the page walk cache, wherein the page walk cache comprises one or more entries for both host processes and guest processes.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
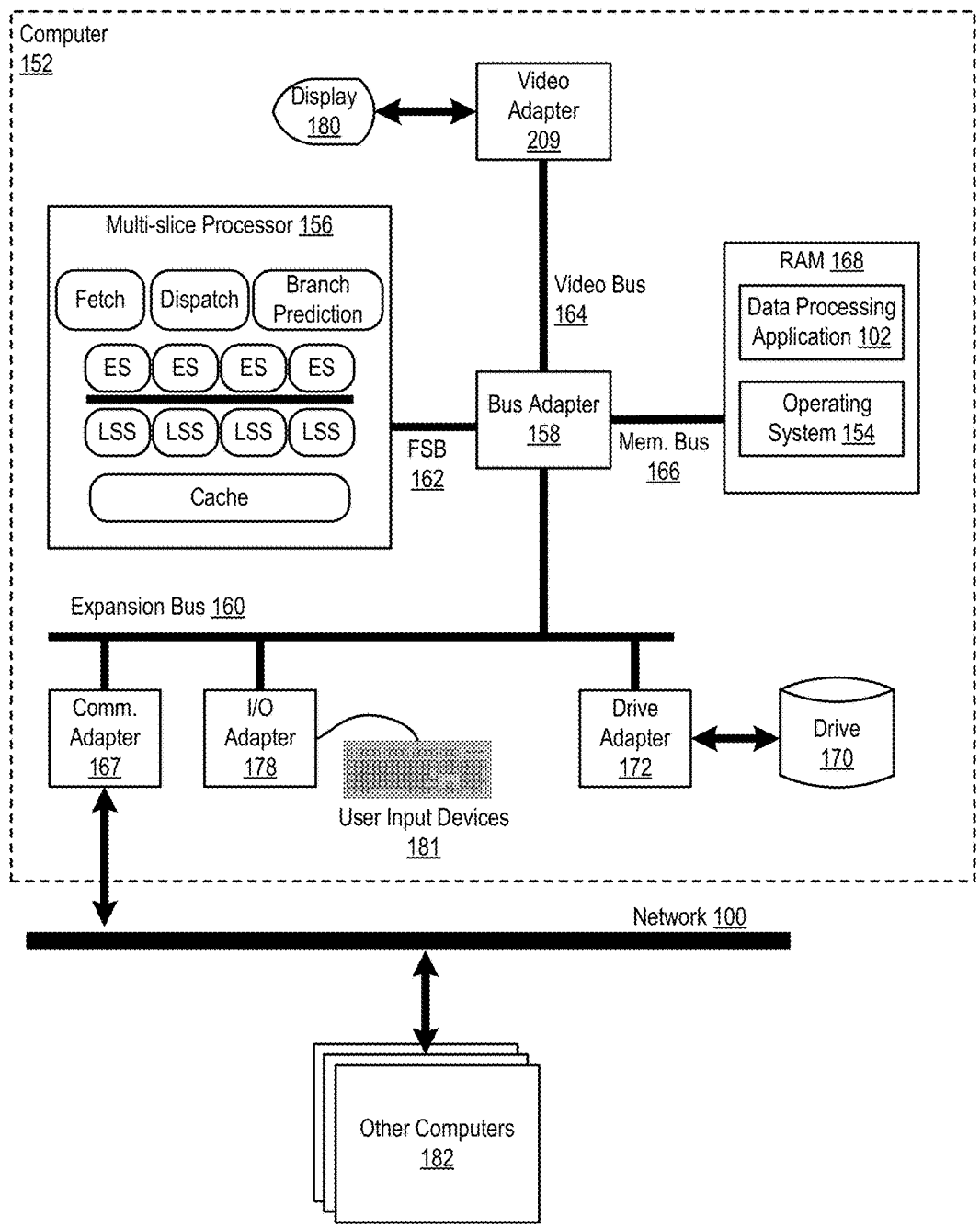
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
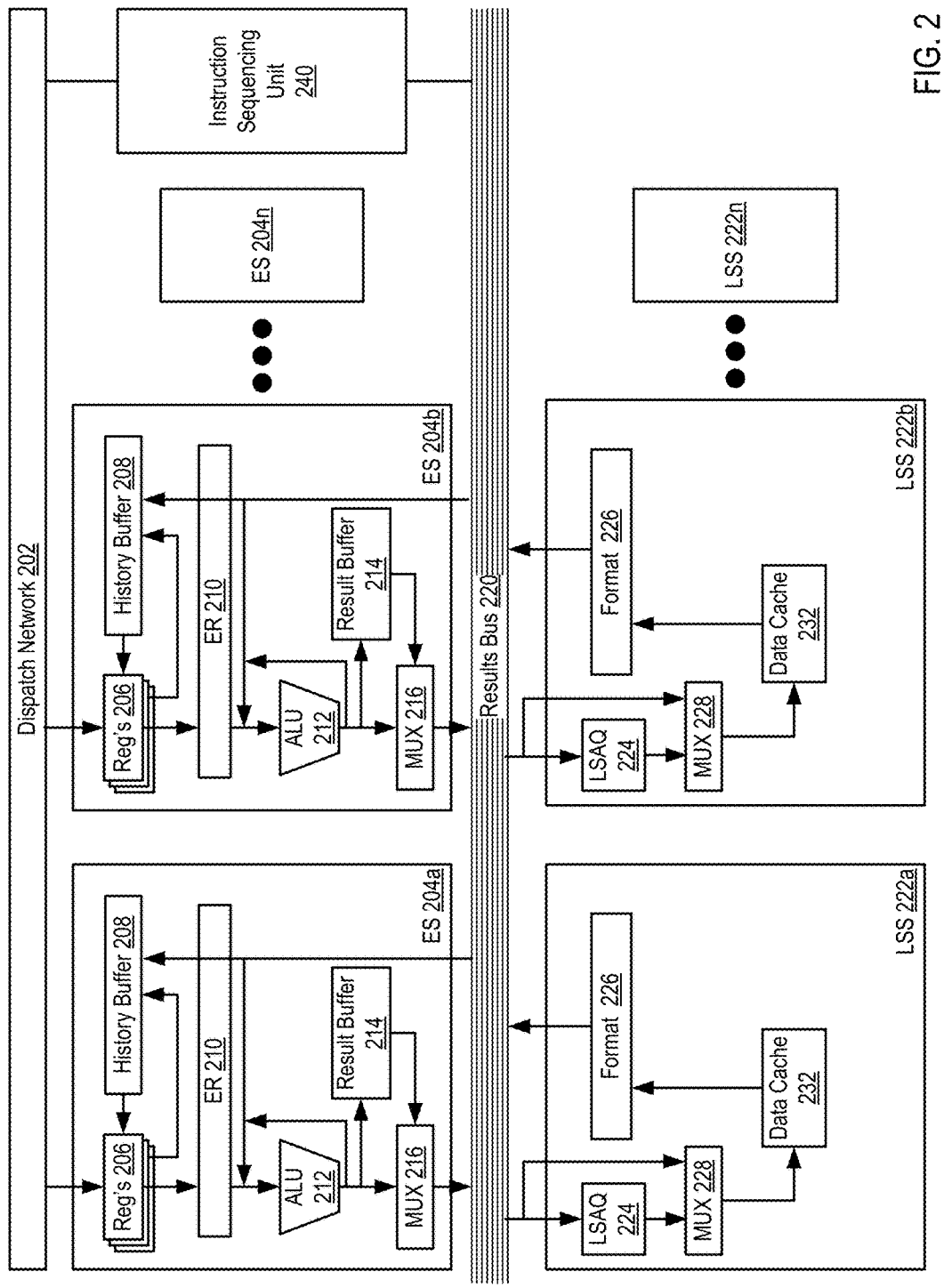
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204*a*, 204*b*-204*n*). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222*a*, 222*b*, 222*c*) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222*a*, 222*b*-222*n*). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
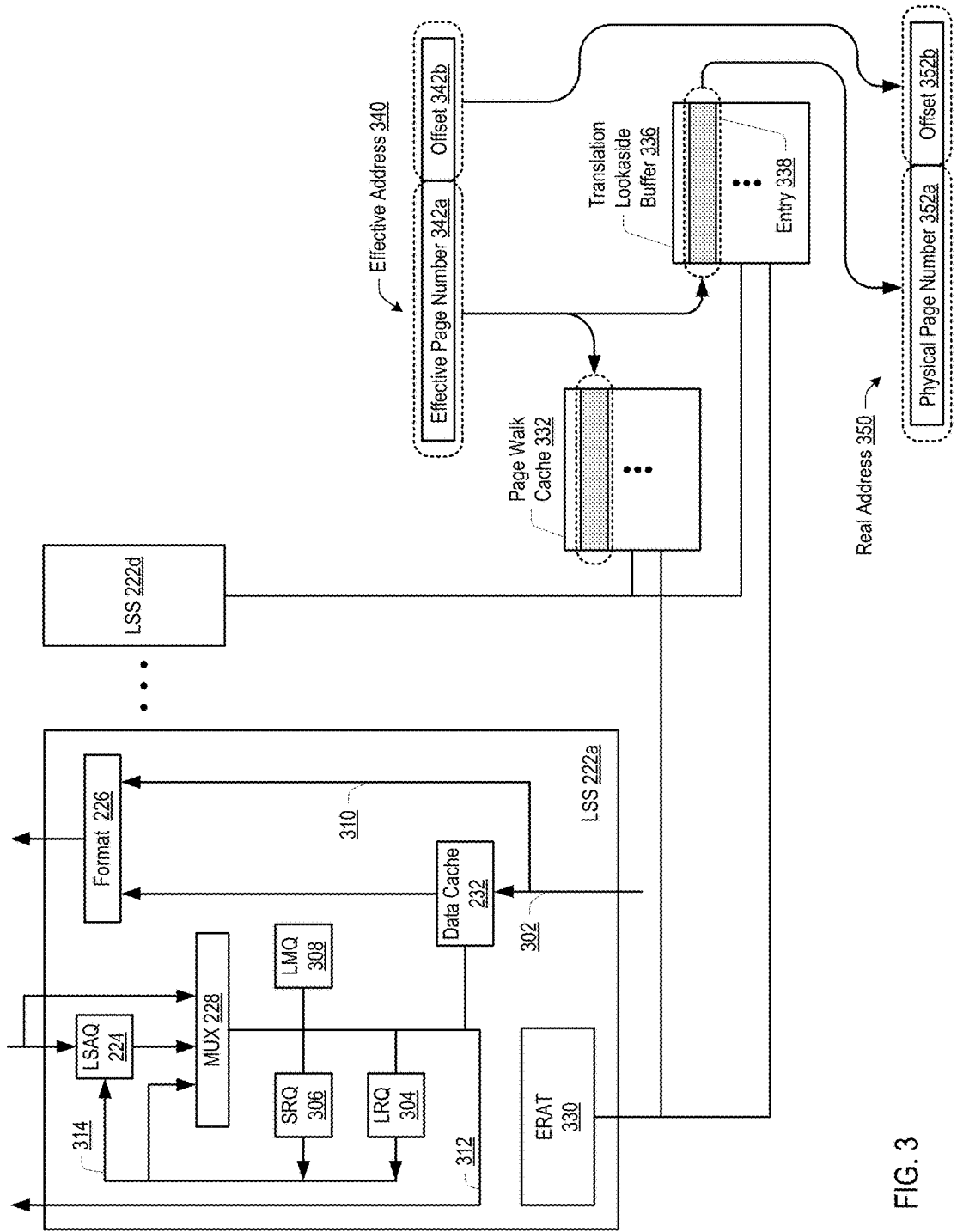
FIG. 3 sets forth a block diagram of a portion of a load/store slice of a multi-slice processor, where the load/store slice implements a unified page walk cache according to different embodiments.

For further explanation, FIG. 3 sets forth a block diagram depicting an expanded view of a load/store slice (222*a*) implementing architectural components that include a load/store access queue (LSAQ) (224), a load reorder queue (LRQ) (304), a load miss queue (LMQ) (308), a store reorder queue (SRQ) (306), a data cache (232), an effective address to real address (ERAT) (330) cache, a page walk cache (332), a translation lookaside buffer (TLB) (336), among other components.

The load/store slice (222*a*) may retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222*a*) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice. For example, the store reorder queue (306) may signal the load/store access queue (224) to reissue an instruction along line (314).

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices. For example, the load reorder queue (304) may signal the load/store access queue (224) to reissue an instruction along line (314).

The effective address to real address (330) cache may be implemented on individual load/store slices, where the effective address to real address (330) cache may be indexed according to an effective address field of an instruction, where an indexed entry of the effective to real address (330) cache may store a correspondingly mapped real address field.

The translation lookaside buffer (336) may be implemented as a cache that may be indexed according to an effective address field of an instruction, where an indexed entry of the translation lookaside buffer (336) may store a correspondingly mapped real address field. Further, the translation lookaside buffer (336) may be coupled to one or more load/store slices. As depicted in the example configuration of FIG. 3, translation lookaside buffer (336) may be coupled to and provide translations for load/store slices (222a)-(222d), where a value for "d" may vary, and may include 1, 2, 4, or 8, among other possibly values. A table, or directory, of translations may be defined according to a user-level process.

The page walk cache (332) may be implemented as a cache that may be indexed according to an effective address field. However, instead of storing translation addresses, the page walk cache (332) may store a reference to a page table, which allows avoiding multiple levels of address translations and loading and accessing multiple different levels of page directories.

A load/store slice (222), for a given load or store instruction specifying an effective or virtual address, may perform a translation from the effective address to a real address. An effective address may correspond to an address space defined for a host process, which may also be referred to as a hypervisor, or to an address space defined for a guest process, which may also be referred to as a virtual instance of an operating system. In the case of a host process, a real address may specify a location or physical address within a physical storage device. In the case of a guest process, which may be considered to be nested within a host process, what is a real address to the guest process may need additional translation to specify a location or physical address within a physical storage device—where the host process may specify page table mappings of real address from the guest process to physical addresses within physical storage devices.

In other words, generally, translations from effective addresses to real addresses may go through multiple levels of translation—where a combination of the effective address to real address (330) cache, the translation lookaside buffer (336), and the page walk cache (332) may serve to store different results of previous address translations to speed future address translations.

Effective address to real address translations may be stored within different tiers of memory having different performance characteristics, with a first tier being the effective address to real address (330) cache, a second tier being the translation lookaside buffer (336), a third tier being one or more page tables reachable through one or more page directories stored in a lower tier or tiers of processor memory. The effective address to real address (330) cache and the translation lookaside buffer (336) may both cache results of previous address translations retrieved from stored page tables. The page walk cache (332) may store results that allow the avoidance of performing a full page walk through every level of a multi-level address translation.

The load/store slice (222a), in performing an effective address to real address translation for a load or store instruction, may first use an effective page number (342a) field of the effective address of the instruction to index the effective address to real address translation (330) cache. If there is a hit, then the entry for the hit provides the translation of an effective page number to a physical page number—where the real address used to access physical memory is comprised of the physical page number from the entry and an offset from an offset field of the effective address.

Otherwise, on a miss of the effective address to real address (330) cache, the load/store slice (222a) may index the translation lookaside buffer (336) using the effective page number (342a) of the effective address (340). If there is a hit, then the entry for the hit provides the translation for the effective page number (342a) of the effective address (340) to physical page number (352a)—where the real address (350) used to access physical memory is comprised of the physical page number (352a), which may be obtained from the stored value in entry (338). Further, the offset (342b) field of the effective address (340) may be used in specifying the offset (352b) of the real address (350).

Otherwise, on a miss of the translation lookaside buffer (336), the load/store slice (222a) may perform a page walk of the multiple nested levels of address translation—where each level may correspond to a page directory indexed by a portion of the effective address ultimately leading to a page table storing effective to real translation addresses. The page directories and page tables may be read from lower tiers of processor memory.

The page walk cache (332) may be used to store a reference to a page directory leading to a page table including the translation for the effective address, where a subsequent page walk may avoid loading and referencing each of the page directories leading up to the page table storing the translation if the effective address results in a hit on an entry for a previously cached effective address. The translation retrieved from the page table at the end of a page walk may be stored in the translation lookaside buffer (336) or the effective address to real address (330) cache, or both.

Figure 4:
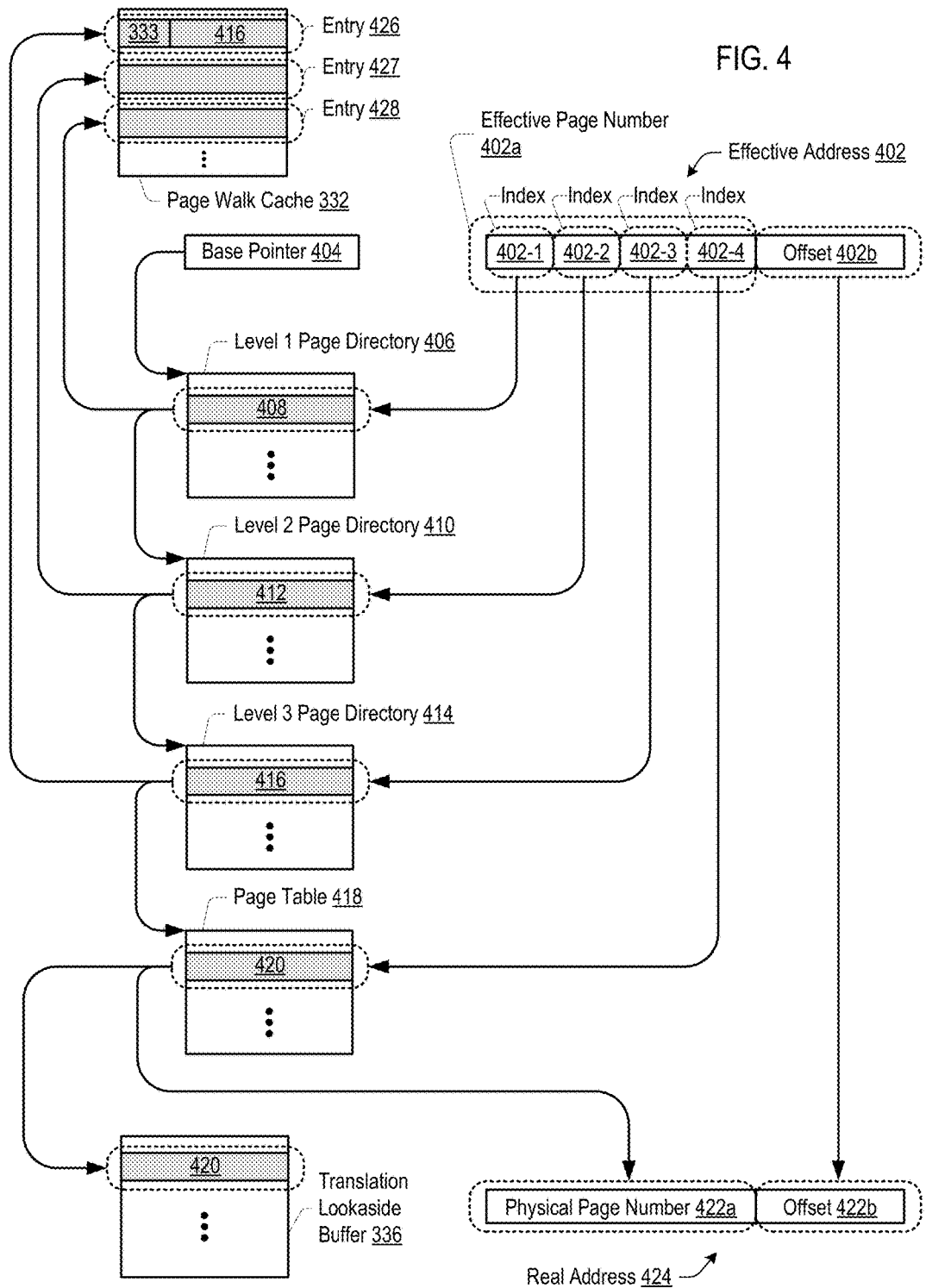
FIG. 4 sets forth a block diagram of a portion of a load/store slice and memory management components of a multi-slice processor, where the load/store slice implements a unified page walk cache according to different embodiments.

For further explanation, FIG. 4 sets forth a block diagram depicting an expanded view of a load/store slice (222a) and memory management components of a multi-slice processor. In this example there are four levels of translation and four corresponding index fields (402-1, 402-2, 402-3, 404-4) of the effective page number (402a). As noted above with regard to FIG. 3, a page walk is performed after a miss in the effective address to real address (330) cache and a miss in the translation lookaside buffer (336)—where the page walk completes when a page table with the translation of the effective page number (402a) of the effective address (402) is accessed.

The page table (418) storing the translation address is reached through multiple levels of page directories. Given the effective page number (402a), and the four index fields, the first page directory (406) may be reached by referencing a base pointer (404), where the index (402-1) field value is used to index into entry (408), and where entry (408) stores a reference to a base address of the second page directory (410). The page walk continues by loading and indexing the second page directory (410) using the index (402-2) field value to index into entry (412), where entry (412) stores a reference to a base address of the third page directory (414). The page walk continues by loading and indexing the third page directory (414) using the index (402-3) field value to index into entry (416), where entry (416) stores a reference to a base address of the page table (418), which stores the translation address. The page walk concludes by loading and indexing the page table (418) using the index (402-4) field value to index into entry (420), where entry (420) stores the translation address from the effective page number (402a) to physical page number (422a)—where the real address (424) is comprised of the physical page number (422a) and the offset (422b). The offset (422b) may be drawn from offset (402b) field of the effective address (402).

The entry (420) translation address from page table (418) may be stored in the translation lookaside buffer (336), the effective address to real address (330) cache, or both. Further, the page walk cache (332) may be updated to store, in entry (426), the reference to the page table, entry (416), which is the entry value at the end of the chain of page directories, and where the reference to the page table (418) may be indexed using the effective page number (402a). Similarly, the page walk cache (332) may be updated to store entry values (427) and (428) for referencing the level 1 page directory (406) and level 2 page directory (410) which are indexed in performing the page walk. While this example indicates that entry (426) stores a directory entry for the level 3 page directory (414), in general, the page walk cache (332) may store entries for page directories at any level. In this way, given spatial locality, on a subsequent beginning of a page walk, the page walk cache (332) may be indexed using the effective page number (402a) field of an effective address, and on a hit, the page table may be referenced without having to first load and index each of the page directories leading up to the page table—thereby saving processor cycles and resources.

As noted above, an effective address may correspond to an address space defined for a host process, which may also be referred to as a hypervisor, or to an address space defined for a guest process, which may also be referred to as a virtual instance of an operating system. Further, a host process and a guest process—while operating within their own respective address spaces—may have distinct physical address spaces, but overlaps of their effective address space.

Distinguishing between overlaps of effective address spaces for host processes and guest processes would normally require individual page walk caches. However, as depicted in FIG. 4, the page walk cache (332) is a unified page walk cache including entries that include a field (333), where the field (333) may be used to indicate a process type—a host process, a guest process, or some other number of different types of processes. In this way, by distinguishing among process types within an entry, the page walk cache (332) may unify, within a single cache, storage for any number of different processes, including nested processes, for performing address translations.

Further, a single, unified page walk cache may allow for allocation policies to be defined that specify dynamic allocations of page walk cache resources among the multiple different processes sharing the page walk cache. For example, if a host process is expected to perform fewer address translations than one or more guest processes, then the allocation policy may be defined to indicate a smaller portion of the page walk cache entries to be dedicated to the host process than a portion of the page walk cache to be dedicated to a guest process. Further, an allocation policy that sets aside minimum and maximum resource usage for different processes, may prevent any given process from preventing another process from making use of the page walk cache. In some cases, the allocation policy may allocate resources to different processes based on expected workload for the different processes, including a host process and one or more guest processes.

Figure 5:
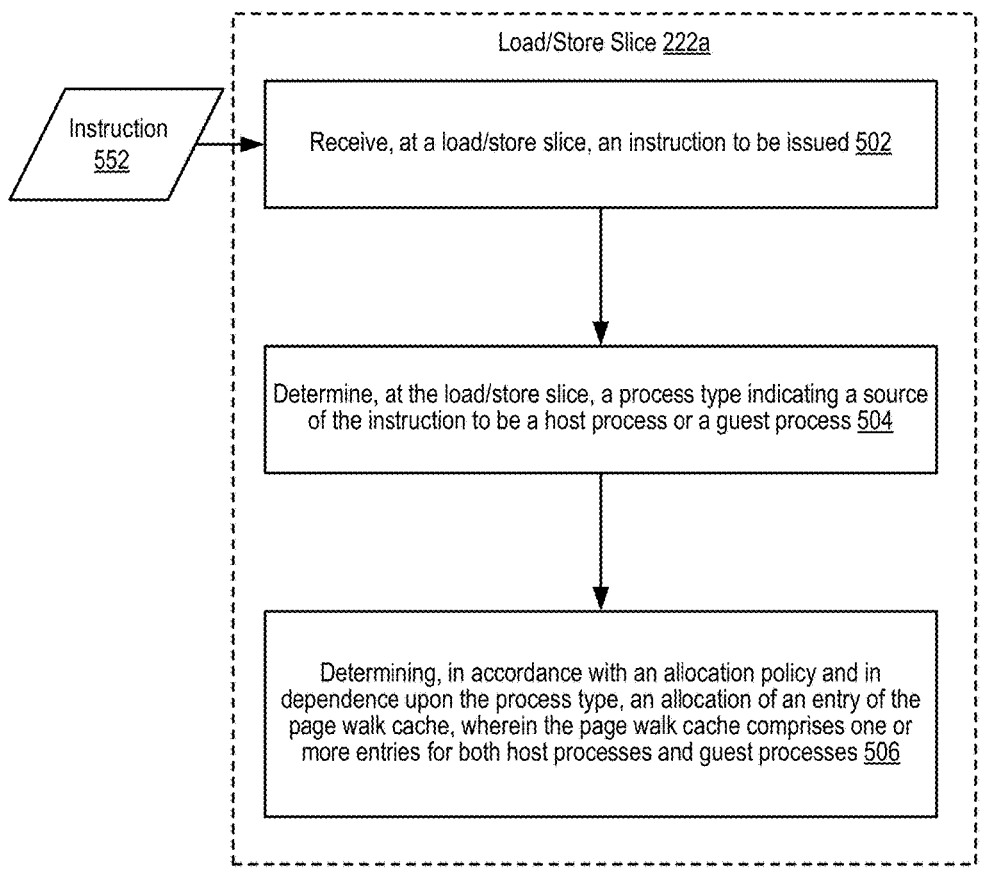
FIG. 5 sets forth a flow chart illustrating an exemplary method of operation of a multi-slice processor in which a load/store slice is configured to implements a unified page walk cache according to different embodiments.

For further explanation, FIG. 5 sets forth a flow chart illustrating an exemplary method of operation of a multi-slice processor implementing a unified page walk cache. The method of FIG. 5 may be carried out by a multi-slice processor similar to that in the examples of FIGS. 1-3. Such a multi-slice processor may include a page walk cache (332), a plurality of load/store slices (220a-220n), where a load/store slice (222) may include a load/store access queue (224), as described above with regard to FIGS. 3 and 4.

The method of FIG. 5 also includes receiving (502), at a load/store slice (222a), an instruction (552) to be issued. Receiving (502) the instruction may be carried out by the load/store slice (222a) receiving the instruction at the load/store access queue (224), and moving the instruction through the load/store slice (222a) pipeline. The instruction (552) may be received from the instruction sequencing unit (240), and the instruction (552) may be a load or store instruction—where the instruction specifies an effective address such as those described with regard to FIGS. 3 and 4.

The method of FIG. 5 also includes determining (504), at the load/store slice (222a), a process type indicating a source of the instruction to be a host process or a guest process. Determining (504) a process type may be carried out by the load/store slice (222a) accessing a register file storing a bit, or flag, indicating a process type for the process corresponding to the received instruction—where the register file bit or flag may be set in dependence upon a current interrupt. In other cases, determining (504) a process type may be carried out by the load/store slice accessing a process identifier associated with the instruction and referencing a process table corresponding process identifiers with process types. While in this example, there are two process types, in general, any number of process types may be specified to share the page walk cache, where the indicator field, or tag bits, in an entry of the page walk cache would be a number sufficient to distinctly map to each different process type.

The method of FIG. 5 also includes determining (506), in accordance with an allocation policy and in dependence upon the process type, an allocation of an entry of the page walk cache (332), wherein the page walk cache (332) comprises one or more entries for both host processes and guest processes. Determining (506) an allocation of an entry of the page walk cache (332) may be carried out by the load/store slice (222a) accessing an allocation policy that sets aside minimum and maximum resource usage for host processes and guest processes and determining resources specified to be allocated for the process type—and determining entries or resources of the page walk cache (332) to be used according to the allocation policy for the process type. For example, the allocation policy may specify that 20 percent of all page walk cache (332) entries be reserved for a host process, and that the remaining 80, percent of all page walk cache (332) entries be reserved for guest processes. Other allocations policy definitions may be specified by default, or though a user writeable configuration file—where the allocation policy may also specify dynamic parameters for adjusting resource allocation among different processor types in dependence upon execution or resource conditions of the multi-slice processor.

In this way, a unified page walk cache, in this case, page walk cache (332), may allow entries of the page walk cache (332) to be dynamically allocated between host processes and guest processes—where the indicator field of an entry of the page walk cache may be used to distinguish between the different process types.

Figure 6:
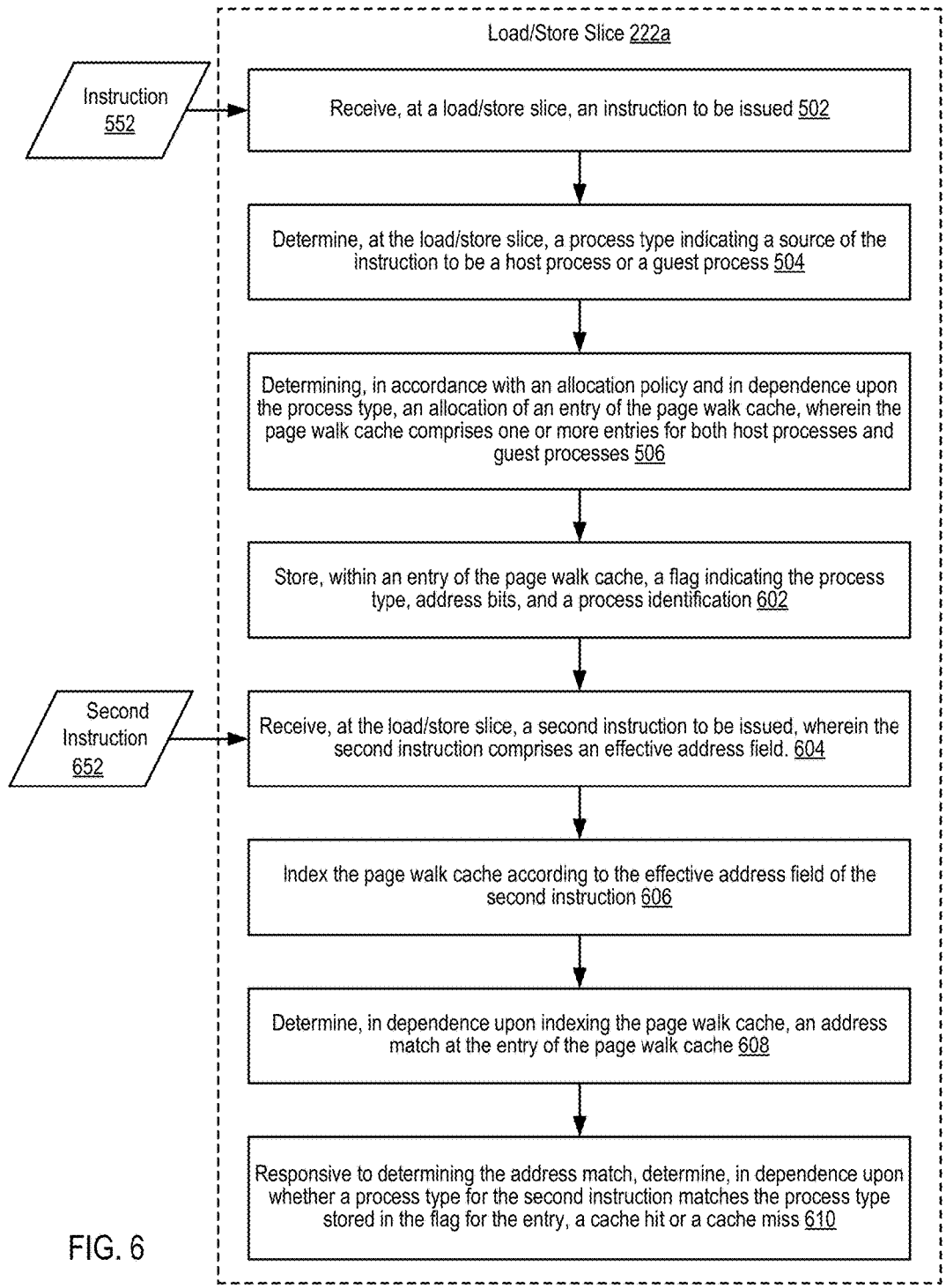
FIG. 6 sets forth a flow chart illustrating an exemplary method of operation of a multi-slice processor in which a load/store slice is configured to implements a unified page walk cache according to different embodiments.

For further explanation, FIG. 6 sets forth a flow chart illustrating an exemplary method of operation of a multi-slice processor implementing a unified page walk cache. The method of FIG. 6 may be carried out by a multi-slice processor similar to that in the examples of FIGS. 1-3. Such a multi-slice processor may include a page walk cache (332), a plurality of load/store slices (220a-220n), where a load/store slice (222) may include a load/store access queue (224), as described above with regard to FIGS. 3 and 4.

The method of FIG. 6 is similar to the method of FIG. 5 in that the method of FIG. 6 also includes receiving (502), at a load/store slice (222a), an instruction (552) to be issued; determining (504), at the load/store slice (222a), a process type indicating a source of the instruction to be a host process or a guest process; and determining (506), in accordance with an allocation policy and in dependence upon the process type, an allocation of an entry of the page walk cache (332), wherein the page walk cache (332) comprises one or more entries for both host processes and guest processes.

The method of FIG. 6 differs from the method of FIG. 5, however, in that the method of FIG. 6 further includes: storing (602), within the entry of the page walk cache (332), a flag indicating the process type, address bits, and a process identification; receiving (604), at the load/store slice (222a), a second instruction to be issued, wherein the second instruction comprises an effective address field; indexing (606) the page walk cache (332) according to the effective address field of the second instruction; determining (608), in dependence upon indexing the page walk cache (332), an address match at the entry of the page walk cache; and responsive to determining the address match, determining (610), in dependence upon whether a process type for the second instruction matches the process type stored in the flag for the entry, a cache hit or a cache miss.

Storing (602), within the entry of the page walk cache (332), a flag indicating the process type, address bits, and a process identification, may be carried out by the load/store slice (222a) writing to the cache at a position corresponding to the entry of the page walk cache (332)—where the entry may be determined according to step (506).

Receiving (604), at the load/store slice (222a), a second instruction (652) to be issued may be carried out by the load/store slice (222a) receiving the second instruction at the load/store access queue (224), and moving the second instruction through the load/store slice (222a) pipeline. The second instruction (652) may be received from the instruction sequencing unit (240), and the instruction (652) may be a load or store instruction—where the instruction specifies an effective address such as those described with regard to FIGS. 3 and 4.

Indexing (606) the page walk cache (332) according to the effective address field of the second instruction may be carried out by the load/store slice (222a) indexing the page walk cache (332) using the effective page number field of the effective address for the second instruction. For example, the page walk cache (332) may be a content-addressable memory or associative memory that may be indexed according to an address.

Determining (608), in dependence upon indexing the page walk cache (332), an address match at the entry of the page walk cache may be carried out by the load/store slice (222a) indexing the page walk cache (332) according to the effective page number of the effective address and determining that the contents of the entry are valid.

Determining (610), in dependence upon whether a process type for the second instruction matches the process type stored in the flag for the entry, a cache hit or a cache miss may be carried out by the load/store slice determining a cache hit of the page walk cache (332) if the address contents of the entry are valid and if the process type in the entry matches the process type for a source of the second instruction.

Otherwise, if the address contents of the entry in the page walk cache (332) indicate are valid, but the process type in the entry does not match the process type for the source of the second instruction, then the access of the page walk cache (332) is determined to be a cache miss, which would initiate a page walk though the multiple nested levels of address translation as discussed above with regard to FIG. 4.

In this way, the load/store slice (222a) may use a single, unified page walk cache for multiple types of processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a page walk cache, a plurality of execution slices, and a plurality of load/store slices, the method comprises: receiving, at a load/store slice, an instruction to be issued; determining, at the load/store slice, a process type indicating a source of the instruction to be a host process or a guest process; and determining, in accordance with an allocation policy and in dependence upon the process type, an allocation of an entry of the page walk cache, wherein the page walk cache stores a reference to a page table, wherein the page walk cache comprises one or more entries for both host processes and guest processes, wherein at least one entry in the page walk cache stores a result of a previous page walk carried out for address translation, wherein the allocation policy specifies a first portion of the page walk cache to be dedicated to one or more host processes, and wherein the allocation policy specifies a second portion of the page walk cache to be dedicated to one or more guest processes, and wherein the allocation policy specifies a first minimum and maximum quantity of entries of the page walk cache for the first portion of the page walk cache in dependence upon an expected workload for the one or more host processes, and wherein the allocation policy specifies a second minimum and maximum quantity of entries of the page walk cache for the second portion of the page walk cache in dependence upon an expected workload for the one or more guest processes.

2. The method of claim 1, further comprising:
storing, within the entry of the page walk cache, a flag indicating the process type, address bits, and a process identification.

3. The method of claim 2, further comprising:
receiving, at the load/store slice, a second instruction to be issued, wherein the second instruction comprises an effective address field;
indexing the page walk cache according to the effective address field of the second instruction;
determining, in dependence upon indexing the page walk cache, an address match at the entry of the page walk cache;
responsive to determining the address match:
determining, in dependence upon whether a process type for the second instruction matches the process type stored in the flag for the entry, a cache hit or a cache miss.

4. The method of claim 3, wherein if the process type for the second instruction matches the process type for the given entry, then determining the cache hit or the cache miss comprises determining a cache hit.

5. The method of claim 3, wherein if the process type for the second instruction does not match the process type for the given entry, then determining the cache hit or the cache miss comprises determining a cache miss.

6. A multi-slice processor comprising: a page walk cache, a plurality of execution slices, and a plurality of load/store slices, wherein the multi-slice processor is configured to carry out: receiving, at a load/store slice, an instruction to be issued; determining, at the load/store slice, a process type indicating a source of the instruction to be a host process or a guest process; and determining, in accordance with an allocation policy and in dependence upon the process type, an allocation of an entry of the page walk cache, wherein the page walk cache stores a reference to a page table, wherein the page walk cache comprises one or more entries for both host processes and guest processes, wherein at least one entry in the page walk cache stores a result of a previous page walk carried out for address translation, wherein the allocation policy specifies a first portion of the page walk cache to be dedicated to one or more host processes, and wherein the allocation policy specifies a second portion of the page walk cache to be dedicated to one or more guest processes, and wherein the allocation policy specifies a first minimum and maximum quantity of entries of the page walk cache for the first portion of the page walk cache in dependence upon an expected workload for the one or more host processes, and wherein the allocation policy specifies a second minimum and maximum quantity of entries of the page walk cache for the second portion of the page walk cache in dependence upon an expected workload for the one or more guest processes.

7. The multi-slice processor of claim 6, wherein the multi-slice processor is further configured to carry out:
storing, within the entry of the page walk cache, a flag indicating the process type, address bits, and a process identification.

8. The multi-slice processor of claim 7, wherein the multi-slice processor is further configured to carry out:
receiving, at the load/store slice, a second instruction to be issued, wherein the second instruction comprises an effective address field;
indexing the page walk cache according to the effective address field of the second instruction;
determining, in dependence upon indexing the page walk cache, an address match at the entry of the page walk cache;
responsive to determining the address match:
determining, in dependence upon whether a process type for the second instruction matches the process type stored in the flag for the entry, a cache hit or a cache miss.

9. The multi-slice processor of claim 8, wherein if the process type for the second instruction matches the process type for the given entry, then determining the cache hit or the cache miss comprises determining a cache hit.

10. The multi-slice processor of claim 8, wherein if the process type for the second instruction does not match the process type for the given entry, then determining the cache hit or the cache miss comprises determining a cache miss.

11. An apparatus comprising: a page walk cache, a plurality of execution slices, and a plurality of load/store slices, wherein the multi-slice processor is configured to carry out: receiving, at a load/store slice, an instruction to be issued; determining, at the load/store slice, a process type indicating a source of the instruction to be a host process or a guest process; and determining, in accordance with an allocation policy and in dependence upon the process type, an allocation of an entry of the page walk cache, wherein the page walk cache stores a reference to a page table, wherein the page walk cache comprises one or more entries for both host processes and guest processes, wherein at least one entry in the page walk cache stores a result of a previous page walk carded out for address translation, wherein the allocation policy specifies a first portion of the page walk cache to be dedicated to one or more host processes, and wherein the allocation policy specifies a second portion of the page walk cache to be dedicated to one or more guest processes, and wherein the allocation policy specifies a first minimum and maximum quantity of entries of the page walk cache for the first portion of the page walk cache in dependence upon an expected workload for the one or more host processes, and wherein the allocation policy specifies a second minimum and maximum quantity of entries of the page walk cache for the second portion of the page walk cache in dependence upon an expected workload for the one or more guest processes.

12. The apparatus of claim 11, wherein the multi-slice processor is further configured to carry out:
storing, within the entry of the page walk cache, a flag indicating the process type, address bits, and a process identification.

13. The apparatus of claim 12, wherein the multi-slice processor is further configured to carry out:
receiving, at the load/store slice, a second instruction to be issued, wherein the second instruction comprises an effective address field;
indexing the page walk cache according to the effective address field of the second instruction;
determining, in dependence upon indexing the page walk cache, an address match at the entry of the page walk cache;
responsive to determining the address match:
determining, in dependence upon whether a process type for the second instruction matches the process type stored in the flag for the entry, a cache hit or a cache miss.

14. The apparatus of claim 13, wherein if the process type for the second instruction matches the process type for the given entry, then determining the cache hit or the cache miss comprises determining a cache hit.

15. The apparatus of claim 13, wherein if the process type for the second instruction does not match the process type for the given entry, then determining the cache hit or the cache miss comprises determining a cache miss.

* * * * *